UNITED STATES PATENT OFFICE.

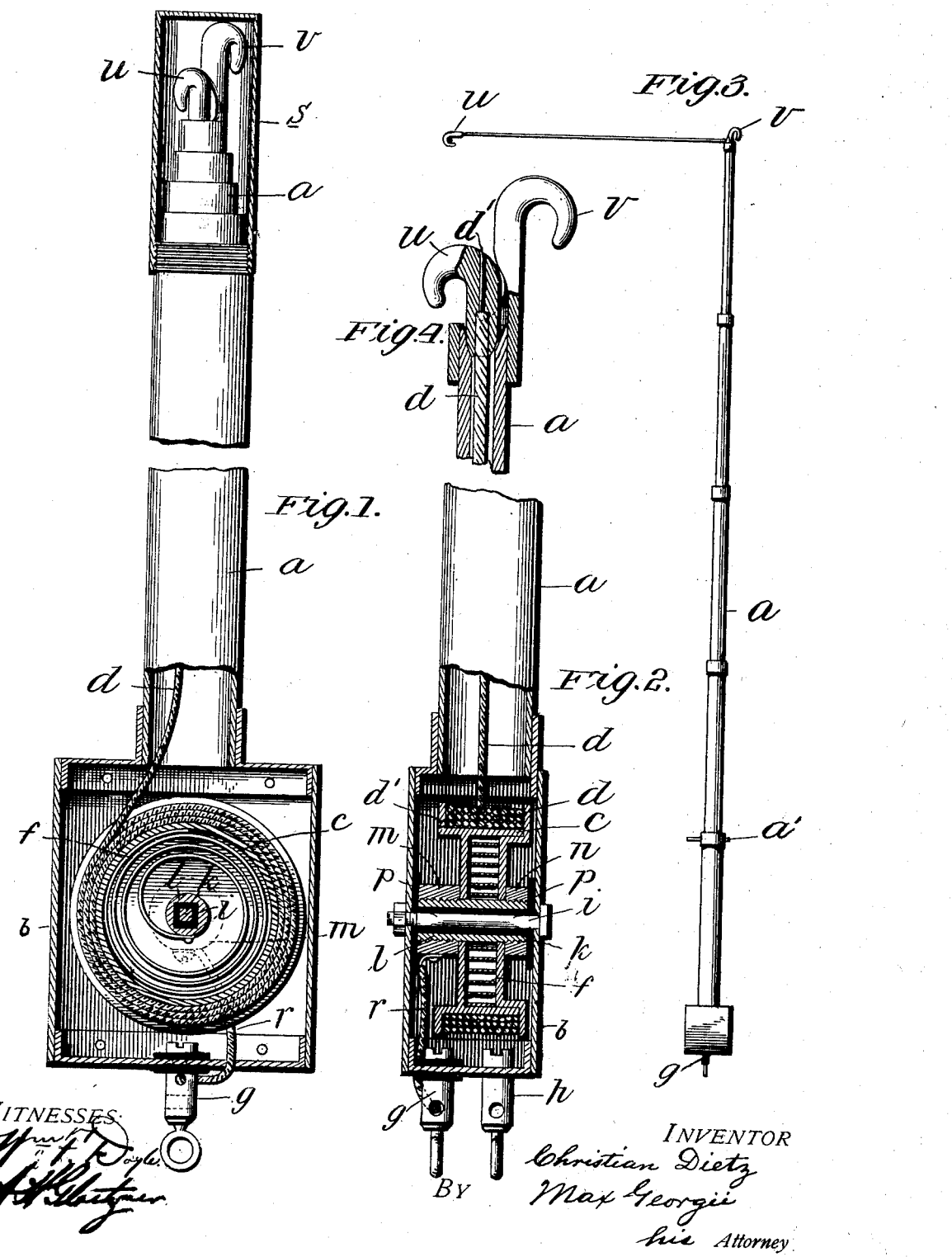

CHRISTIAN DIETZ, OF MUNICH, GERMANY.

LINE-TAPPING DEVICE FOR TELEGRAPH OR TELEPHONE CIRCUITS.

SPECIFICATION forming part of Letters Patent No. 719,095, dated January 27, 1903.

Application filed August 2, 1902. Serial No. 118,119. (No model.)

*To all whom it may concern:*

Be it known that I, CHRISTIAN DIETZ, a citizen of Bavaria, Germany, residing at Blütenburgstrasse 4, Munich, Germany, have invented certain new and useful Improvements in Line-Tapping Devices for Telegraph or Telephone Circuits; and I do hereby declare the following to be a full, clear, and exact description of the invention, such as will enable others skilled in the art to which it appertains to make and use the same.

My invention relates to improvements in line-tapping devices for telegraph and telephone circuits.

The object of my invention is to provide an apparatus by means of which a telegraph or telephone circuit may be quickly and readily tapped to include another instrument in said circuit.

Another object of my invention is to provide an apparatus which is portable and which when not in use will occupy but a small space.

With these general objects in view and some others which will be obvious to those skilled in the art from the description hereinafter an apparatus embodying my invention, broadly considered, comprises a rigid conductor, means for connecting said conductor to one of the line-wires of a telegraph or telephone circuit, a flexible conductor and means for connecting the flexible conductor to its corresponding line-wire, said means being so constructed that it may be moved into position for attachment to the line-wire by the rigid conductor, which thus serves not only as a conductor, but also as a mechanical device for operating or placing said connecting means for the flexible conductor.

More specifically considered, such an apparatus also comprises means for taking up the slack in the flexible cable and means for quickly connecting the instrument which it is desired to introduce into the circuit to the rigid conductor and flexible conductor, respectively.

The invention will first be described in connection with the accompanying drawings, and then particularly pointed out in the claims.

In the drawings, Figure 1 is a section, partly in elevation, of an apparatus embodying my invention, a portion having been broken away; Fig. 2, a central section of the lower portion of the apparatus; Fig. 3, a diagrammatic view illustrating the manner of using my invention, and Fig. 4 a detail view showing the manner in which the device for connecting the flexible conductor to its line-wire is arranged to be supported by the upper end of the rigid conductor.

Referring to the drawings, it will be seen that the rigid conductor is collapsible, in the present instance being formed of a telescopic tube $a$, whose sections or parts are united, so that they will slide into each other with sufficient friction to permit the tube when extended to remain thus when being raised for attachment to an overhead wire. If desired, however, the joints may be provided with suitable securing means—as, for example, the pins $a'$, Fig. 3, shown on the lowest joint, which pin passes through both tubes at the joint.

The rigid conductor is provided with suitable means for connecting it to the desired line-wire—as, for example, a hook $v$, secured to the upper end of the upper section of the telescopic tube $a$ and arranged to be hooked over the line-wire. To the bottom of the lower section of the tube $a$ is connected a casing $b$, through the sides of which passes a bolt $i$, square in cross-section and having the usual head and nut, as shown in Fig. 2. The said square bolt $i$ is surrounded by a square tube of insulating material, as indicated at $k$, which square tube is in turn surrounded by a bearing $l$, of conducting material, this bearing being cylindrical on its periphery and having a square axial opening in which the square tube $i$ fits snugly. At each end of the bearing $l$ and between its ends and the sides of the casing are located washers $p$, of insulating material. Upon the bearing is rotatably mounted a reel $c$, also made of conductive material, said reel being held against endwise movement on the bearing by means of nuts $m$ and $n$, threaded to the bearing $l$ at each side of the reel. Upon the bottom of the casing $b$ are mounted two binding-posts $g$ and $h$, one, $h$, being in electrical communication with the rigid conductor or tube $a$, owing to the fact that the casing $b$, which is connected to the tube $a$, is of conductive material. The other binding-post $g$ is insulated from the casing $b$ in the usual way, as shown in Figs. 1 and 2. The said binding-post $g$ is connected electrically with the reel $c$ in any desired manner—as, for example, by means of the conductor $r$, united to the binding-post $g$ and secured beneath a screw threaded into the nut $m$, as shown in dotted lines in Fig. 1. Upon the reel $c$ a portion of the flexible conductor $d$ is wound, the inner end of said conductor being electrically connected to the reel $c$ in any suitable way, as by soldering, this being indicated at $d'$ in Fig. 2. The said flexible conductor is an insulated one in order to prevent it from making an electric communication with the rigid conductor $a$. The upper end of the flexible conductor is provided with means for attaching it to the desired line-wire, the said means consisting in the present instance of a hook $u$, having its lower end tapered or coned, as shown in Fig. 4, and arranged to enter the open upper end of the topmost section of the telescopic tube. The flexible conductor is electrically connected to the hook in any suitable way, as by inserting it into an opening in said hook and soldering the bared upper end $d^2$ of said conductor to said hook, as clearly shown in Fig. 4. In this way the means for connecting the flexible conductor to its corresponding line-wire may be detachably carried by the rigid conductor for the purpose of lifting the said connecting means up to the line-wire.

A cap $s$ is arranged to be threaded onto the end of the lowermost section of the telescopic tube when the apparatus is in its collapsed condition, thereby protecting the hooks $u$ $v$.

The reel $c$ serves as a means for taking up the slack in the flexible conductor $d$, and for the purpose of maintaining a tension upon said flexible conductor I provide the reel with a coiled spring $f$, (best shown in Fig. 1,) whose inner end is connected to the bearing $l$ by means of the screw, as shown in Fig. 1, the outer end being suitably connected to the interior of the reel $c$, which forms a casing for said spring.

The manner of operating the device hereinbefore described is as follows: The cap $s$ is removed and the telescopic sections extended, thereby unreeling a portion of the flexible conductor from its reel, the tension on said flexible conductor produced by the spring $f$ serving to maintain the hook $u$ in its seat at the top end of the telescopic tube. The latter is now lifted to an erect position and the hook $u$ placed over the desired line-wire. Then the telescopic tube is hung upon the corresponding companion wire of the circuit which it is desired to tap by placing the hook $v$ over said companion wire, the flexible conductor being drawn off the reel during this action to an extent sufficient to span the space between the two line-wires. The appearance of the apparatus at this stage is indicated in Fig. 3. In order now to introduce the desired telegraphic or telephone instrument into the circuit, it is only necessary to connect the two poles of such instrument to the binding-post $g$ and $h$ at the bottom of the casing $b$. The instrument will now be connected with the line-wires engaged by the hooks $u$ and $v$, respectively, through the flexible conductor $d$, the reel $c$, the bearing $l$, nut $m$, wire $r$, binding-post $g$, and back through binding-post $h$, casing $b$, the telescopic tube which forms the rigid conductor $a$, and the hook $v$. To remove the apparatus, the instrument is disconnected from the binding-posts $g$ and $h$. The rigid conductor is manipulated to unhook the hook $v$ from the line-wire and then moved toward the other line-wire, whereby the slack of the flexible conductor is wound upon the reel $c$ by the tension of the spring $f$, thus bringing the hook $u$ back into its seat at the upper end of the rigid conductor, whereupon the said hook $u$ may be readily unhooked from its line-wire. The apparatus is then collapsed by pushing the sections of the telescopic tube back within one another, the spring $f$ reeling up the slack in the flexible conductor $d$ and maintaining the standing portion of said flexible conductor under tension within the tube, so as to prevent any unnecessary wear or chafing of the conductor against the inner walls of the tubes. The cap $s$ is then screwed into place and the apparatus is ready for transport.

What I claim, and desire to secure by Letters Patent of the United States, is—

1. The combination, with a rigid conductor, and a flexible conductor, of means supported by the rigid conductor and arranged to connect the rigid conductor and the flexible conductor, respectively, to the corresponding line-wires.

2. The combination, with a rigid conductor and means secured thereto and arranged to connect said rigid conductor to the corresponding line-wire, of a flexible conductor and means arranged to connect said flexible conductor to its corresponding line-wire, said means being detachably carried by the rigid conductor.

3. The combination with a collapsible rigid conductor and means secured thereto and arranged to connect the rigid conductor to the corresponding line-wire, of a flexible conductor and means arranged to connect said flexible conductor to its corresponding line-wire, said means being detachably carried by the rigid conductor.

4. The combination, with a rigid conductor, and means secured thereto and arranged to connect the rigid conductor to the corresponding line-wire, of a flexible conductor, means arranged to connect said flexible conductor to its corresponding line-wire, and mechanism for taking up slack in the flexible conductor, said mechanism being connected to the rigid conductor.

5. The combination, with a collapsible rigid conductor, and means secured thereto and arranged to connect said rigid conductor to the corresponding line-wire, of a flexible conductor passing through the collapsible conductor, a connecting device secured to one end of the flexible conductor and arranged to connect the same to its corresponding line-wire, said connecting means being arranged to rest against the upper end of the rigid conductor when not in use, and mechanism carried by the rigid conductor and arranged to maintain a yielding tension in the flexible conductor.

6. The combination, with a telescopic tube, a hook secured at the upper end of the same for engagement with the corresponding line-wire, and a casing at the lower end of the tube, of a reel within said casing, a flexible conductor arranged to be wound on said reel, and a connecting-hook secured to the free end of the flexible conductor and arranged to rest, when not in use, at the upper end of the telescopic tube, said hook being arranged to engage the corresponding line-wire.

7. The combination, with a telescopic tube, a hook secured at the upper end of said tube, a casing at the lower end of the tube, and a reel mounted within said casing and insulated from the tube, said reel being of conductive material, of an insulated flexible conductor arranged to be wound on said reel and having one end in electrical connection with the reel, a hook electrically connected to the other end of the flexible conductor and having its shank arranged to enter the upper end of the tube, the hook portion projecting above said tube, a pair of binding-posts carried by said tube, one of said posts being in electrical communication with the tube and the other post insulated therefrom, and means for making an electrical connection between the latter post and the reel.

8. The combination, with a telescopic tube, a hook secured at the upper end thereof, a casing at the lower end of the tube, a square bolt extending through the casing, a square tube of insulating material surrounding said bolt, a cylindrical bearing having a square axial opening and surrounding said square tube, a reel rotatable in said bearing, nuts threaded to the bearing at each side of the reel, and insulating-washers at each end of the bearing inside the casing, of a flexible conductor arranged to be wound on the reel and in electrical communication therewith, means for connecting the free end of the flexible conductor to its corresponding line-wire, a pair of binding-posts carried by the tube, one of said posts being in electrical communication with the tube and the other insulated therefrom, and means for electrically connecting the latter binding-post to one of the nuts on the bearing.

9. The combination, with a telescopic tube, a hook secured at the upper end thereof, a casing at the lower end of the tube, a squared bolt extending through the casing, a square tube of insulating material surrounding said bolt, a cylindrical bearing having a square axial opening and surrounding said square tube, a reel rotatable in said bearing, nuts threaded to the bearing at each side of the reel, a coiled spring connected to the reel and to the bearing, and insulating-washers at each end of the bearing inside the casing, of a flexible conductor arranged to be wound on the reel and in electrical communication therewith, means for connecting the free end of the flexible conductor to its corresponding line-wire, a pair of binding-posts carried by the tube, one of said posts being in electrical communication with the tube and the other insulated therefrom, and means for electrically connecting the latter binding-post to one of the nuts on the bearing.

In testimony whereof I affix my signature in presence of two witnesses.

CHRISTIAN DIETZ.

Witnesses:
GEORG ECLER,
FRITZ STÖCKLER.